US012046384B2

(12) United States Patent
Plys

(10) Patent No.: US 12,046,384 B2
(45) Date of Patent: Jul. 23, 2024

(54) PASSIVE VENTING ARRANGEMENT OF STOICHIOMETRIC HYDROGEN PLUS OXYGEN GASES GENERATED IN A SHIELDED CONTAINER

(71) Applicant: Westinghouse Electric Company LLC, Cranberry Township, PA (US)

(72) Inventor: Martin Gerard Plys, Chicago, IL (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 296 days.

(21) Appl. No.: 17/595,476

(22) PCT Filed: May 19, 2020

(86) PCT No.: PCT/US2020/033613
§ 371 (c)(1),
(2) Date: Nov. 17, 2021

(87) PCT Pub. No.: WO2020/236823
PCT Pub. Date: Nov. 26, 2020

(65) Prior Publication Data

US 2022/0223309 A1 Jul. 14, 2022

Related U.S. Application Data

(60) Provisional application No. 62/851,888, filed on May 23, 2019.

(51) Int. Cl.
*G21F 5/12* (2006.01)
*G21F 9/02* (2006.01)
(Continued)

(52) U.S. Cl.
CPC .................. *G21F 5/12* (2013.01); *G21F 9/02* (2013.01); *G21C 19/40* (2013.01); *G21F 5/06* (2013.01)

(58) Field of Classification Search
CPC ..... G21F 5/12; G21F 5/06; G21F 9/02; G21C 19/40
(Continued)

(56) References Cited

U.S. PATENT DOCUMENTS 4,295,583 A * 10/1981 Schurr ................. B65D 47/063 222/530
5,725,645 A 3/1998 Wickland et al.
(Continued)

FOREIGN PATENT DOCUMENTS

CN 106409370 A 2/2017
CN 104412328 B 3/2017
(Continued)

OTHER PUBLICATIONS

International Search Report and Written Opinion for International PCT Application No. PCT/US2020/033613, dated Aug. 11, 2020.

*Primary Examiner* — Peter M Poon
*Assistant Examiner* — Daniel Wasil
(74) *Attorney, Agent, or Firm* — K&L Gates LLP

(57) ABSTRACT

A passive venting arrangement for use in venting gases produced by radioactive materials. The arrangement includes a source gas region for receiving the gases and a filter ullage region disposed above the source gas region and segregated therefrom. A removable lid includes the filter ullage region and a plurality of bore holes. Each bore hole extends between, and fluidly couples, the source gas region and the filter ullage region. The arrangement also includes a plurality of filters disposed in contact with the filter ullage region. Each filter is structured to provide for an exchange of gases from the filter ullage region through the filter to an ambient environment.

8 Claims, 4 Drawing Sheets

(51) Int. Cl.

| | |
|---|---|
| *G21C 19/40* | (2006.01) |
| *G21F 5/06* | (2006.01) |

(58) Field of Classification Search

USPC .................................................. 376/205, 272

See application file for complete search history.

(56) References Cited

U.S. PATENT DOCUMENTS

| | | | |
|---|---|---|---|
| 6,355,078 | B1 | 3/2002 | Wickland |
| 6,413,304 | B1 | 7/2002 | Wickland et al. |
| 8,758,488 | B1 | 6/2014 | Wickland |
| 9,502,144 | B2 | 11/2016 | Nilsson |
| 2002/0117052 | A1 | 8/2002 | Beers |
| 2009/0056827 | A1 | 3/2009 | Tschantz |

FOREIGN PATENT DOCUMENTS

| | | | |
|---|---|---|---|
| CN | 207213450 | U | 4/2018 |
| EP | 2172944 | A1 | 4/2010 |
| WO | 9813273 | A1 | 4/1998 |
| WO | 2020236823 | A1 | 11/2020 |

* cited by examiner

PASSIVE VENTING ARRANGEMENT OF STOICHIOMETRIC HYDROGEN PLUS OXYGEN GASES GENERATED IN A SHIELDED CONTAINER

CROSS-REFERENCE TO RELATED APPLICATIONS

This application is a U.S. National Stage Entry under 35 U.S.C. § 371 of International Patent Application No. PCT/US2020/033613, entitled PASSIVE VENTING ARRANGEMENT OF STOICHIOMETRIC HYDROGEN PLUS OXYGEN GASES GENERATED IN A SHIELDED CONTAINER, filed May 19, 2020, which claims benefit under 35 U.S.C. § 119 (e) to U.S. Provisional Application Ser. No. 62/851,888 entitled PASSIVE VENTING ARRANGEMENT OF STOICHIOMETRIC HYDROGEN PLUS OXYGEN GASES GENERATED IN A SHIELDED CONTAINER filed on May 23, 2019, the contents of which are incorporated herein by reference in their entirety and for all purposes.

FIELD

The disclosed concept pertains generally to containers for use in storing spent nuclear fuel and, more particularly, to venting arrangements for use in venting gases therefrom. The disclosed concept further relates to containers including such venting arrangements.

BACKGROUND OF THE INVENTION

Storage of spent nuclear fuel, spent ion exchange resins, and special nuclear materials in closed containers can result in generation of mixtures of hydrogen and oxygen, whose worst case condition is a stoichiometric proportion. The generated gases need to be removed via filtered vent paths in order to prevent container pressurization and at the same time to contain contamination. A stoichiometric mixture is highly dangerous because its combustion can result in super-sonic shock waves that could destroy the container and associated confinement boundaries, thus not only causing extensive damage to anything nearby, but also resulting in the undesired release of radioactive material into the environment. Such gas mixtures have resulted in explosions in operating nuclear power stations in situations where the gases accumulated.

A key challenge is that the containers are thick-walled to provide shielding of their contents. A vent path through the shielding presents an unacceptable resistance to removal of the flammable gases, because the vent path resistance is very large compared to the filter resistance.

SUMMARY

Embodiments of the present invention provide a means to safely and passively remove stoichiometric flammable source gases from shielded containers through a filtered vent path, such that the actual gas mixture in the container is not even flammable.

As one aspect of the disclosed concept a passive venting arrangement for use in venting of gases produced by radioactive materials is provided. The venting arrangement comprises: a source gas region structured to receive the gases produced by the radioactive materials; a filter ullage region disposed above the source gas region and segregated therefrom except for a plurality of bore holes which each extend between, and fluidly couple, the source gas region and the filter ullage region; and a plurality of filters disposed in contact with the filter ullage region, wherein each filter is structured to provide for the exchange of gases from the filter ullage region through the filter to an ambient environment.

The plurality of bore holes may comprise at least three bore holes.

The source gas region may be structured to house the radioactive materials.

The source gas region may be structured to receive the gases produced by the radioactive materials which are contained in a source gas location separate from the source gas region.

The passive venting arrangement may further comprise a vent pipe which is structured to fluidly couple the source gas region and the source gas location.

The source gas region may be defined, in-part, by a cone shaped region surrounding an opening of the vent pipe to the source gas region.

As another aspect of the disclosed concept, a containment vessel for use in storing radioactive materials is provided. The containment vessel comprises: a body defining a source gas region therein which is structured to house the radioactive materials; a filter ullage region defined in the body above the source gas region and segregated therefrom except for a plurality of bore holes defined in the body which each extend between, and fluidly couple, the source gas region and the filter ullage region; and a plurality of filters disposed in contact with the filter ullage region, wherein each filter is structured to provide for the exchange of gases from the filter ullage region through the filter to an ambient environment.

The plurality of bore holes comprises at least three bore holes.

The body may comprise a removable lid coupled to the body, wherein the filter ullage region and the plurality of bore holes are defined in the lid.

As yet another aspect of the disclosed concept, another containment vessel for use in storing radioactive materials is provided. The containment vessel comprises: a body defining a source gas region therein which is structured to house the radioactive materials; a first filter ullage region defined in the body above the source gas region and segregated therefrom except for a first plurality of bore holes defined in the body which each extend between, and fluidly couple, the source gas region and the first filter ullage region; a plurality of first filters disposed in contact with the first filter ullage region, wherein each first filter is structured to provide for the exchange of gases from the first filter ullage region through the first filter to an ambient environment; a second filter ullage region, independent from the first filter ullage region, defined in the body above the source gas region and segregated therefrom except for a second plurality of bore holes defined in the body which each extend between, and fluidly couple, the source gas region and the second filter ullage region; and a plurality of second filters disposed in contact with the second filter ullage region, wherein each second filter is structured to provide for the exchange of gases from the second filter ullage region through the second filter to an ambient environment.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
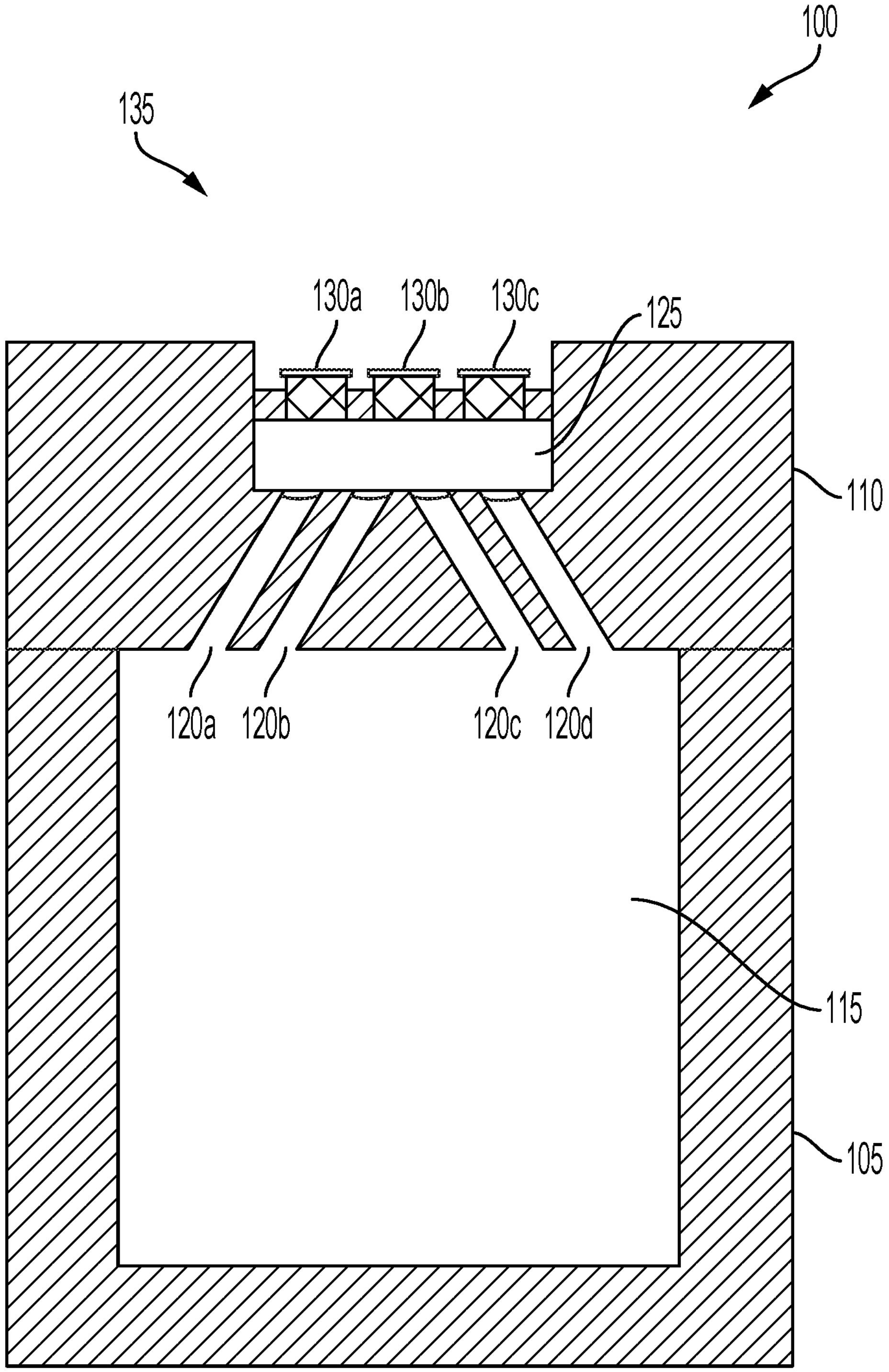
FIG. 1 is a schematic illustration of a passive vent design in accordance with one example embodiment of the disclosed concept in use as a portion of a closed container in accordance with one example embodiment of the disclosed concept.

In the following description, like reference characters designate like or corresponding parts throughout the several views of the drawings. Also in the following description, it is to be understood that such terms as "forward", "rearward", "left", "right", "upwardly". "downwardly", and the like are words of convenience and are not to be construed as limiting terms.

The following description consists of an example application of a venting arrangement in accordance with the present invention, followed by an alternative application that shares the same common key features. The example venting arrangement is shown in FIG. 1.

Referring to FIG. 1, consider a thick-walled (shielded) vessel 100 comprising a vessel body 105 and a top lid 110 whose contents are the source of hydrogen and oxygen produced in stoichiometric proportion, or with less oxygen than in stoichiometric proportion, with stoichiometry being the worst case. The interior of the vessel 115 is called the source gas region, with the source gas emanating from a source gas location, which in the present example is also within the interior of the vessel 115. The atmosphere of the source gas region 115 consists of air plus the source gases hydrogen and oxygen, where the proportions of each gas are controlled by proper design of this invention as described below.

In such example, the contents of the thick-walled vessel 100 in the source gas region/location 115 may be spent nuclear fuel, damaged spent nuclear fuel, highly damaged fuel debris, special nuclear materials, ion exchange resin loaded with radionuclides, or other radioactive waste. The radioactivity of these contents causes liquid water and hydrocarbon materials also in the container to decompose into hydrogen, oxygen, and possibly other hydrocarbon gases.

In the top lid 110 of the vessel there are a plurality of bore holes 120*a-d*, preferably at least three bore holes (four are shown in the example), which join the source gas region 115 to a second gas region called the filter ullage region 125. The filter ullage region 125 is a very small region located at a higher elevation than the source gas region 115, for reasons discussed further below. Thus, the bore holes 120*a-d* and the filter ullage region 125 are located within the vessel top lid 110. The purpose of the filter ullage region 125 is to receive gases from the source gas region 115, and allow these gases to contact filters 130*a-c* which are positioned in contact with the ambient environment 135. The gases may then diffuse from the filter ullage region 125 through the filters 130*a-c* to the ambient environment 135. Hence, a set of two, three, or more (three are shown in the example) sintered metal filters 130*a-c* are connected to the top of the filter ullage region 125. These filters 130*a-c* may be commercial filters such as commonly fitted to threaded bung holes of thin-wall drums or any other suitable filters. Gases are exchanged between the ambient environment 135 and the filter ullage region 125 through the filters 130*a-c*. The purpose of the filters 130*a-c* is to provide a barrier to prevent contamination release from the container 100. The top lid 110 of the container may have more than one of such vent arrangement provided therein.

When the venting arrangement is properly designed, the gas mixture in the gas source region 115 has a lower density than the gas mixture in the filter ullage region 125. This causes the less dense gas to flow up one or more of the bore holes 120*a-d* from the gas source region 115 to the filter ullage region 125, and it also causes the more dense gas to flow down the remaining bore holes 120*a-d* from the filter ullage region 125 to the gas source region 115. Because the concentrations of hydrogen and oxygen in the filter ullage region 125 are greater than their respective concentrations in the ambient environment 135 outside the filters 130*a-c*, hydrogen and oxygen diffuse through the filters 130*a-c* from the filter ullage region 125 to the ambient environment 135. This is ultimately how the hydrogen and oxygen source gases leave the thick-walled vessel 100.

Proper design of such venting arrangement requires the appropriate selection of: (1) the number of bore holes 120*a-d*, (2) the diameter of the bore holes 120*a-d*, (3) the number of filters 130*a-c*, (4) the number of sets of bore hole/filter ullage/filter groups, and (5) the intrinsic ability of the filters 130*a-c* to pass hydrogen and oxygen. When properly designed, the hydrogen concentration in the source gas region 115 is below 4% by volume, which guarantees that the gas mixture is not flammable.

Figure 2:
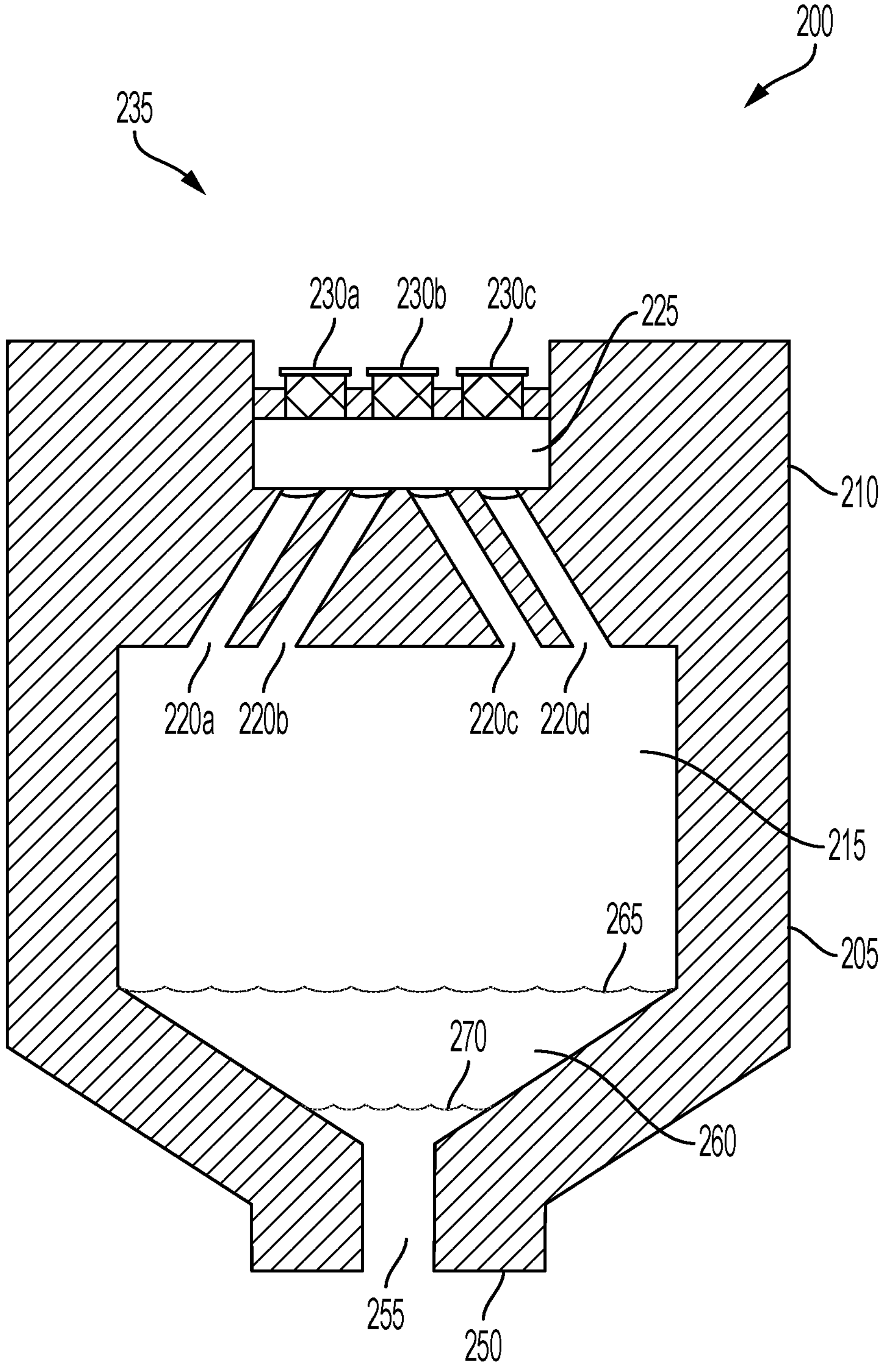
FIG. 2 is a schematic illustration of a passive vent design in accordance with one example embodiment of the disclosed concept in use as a portion of a remote gas collection unit in accordance with one example embodiment of the disclosed concept.

In an alternative application such as schematically illustrated in FIG. 2, which shares a number of aspects similar to those of FIG. 1. Thus, referring to FIG. 2, consider a thick-walled (shielded) vessel 200 comprising a vessel body 205 and a top lid 210 whose contents are the source of hydrogen and oxygen produced in stoichiometric proportion, or with less oxygen than in stoichiometric proportion, with stoichiometry being the worst case. The interior of the vessel 215 is called the source gas region, with the source gas emanating from a source gas location 255. For example, the source gas region 215 is actually the upper termination of a vent pipe 250 which proceeds from the gas source region 215 downwards through a water pool 260 to a submerged container (not shown) holding any of the contents mentioned above for the thick-walled vessel 200. In such example, the submerged container and the vent pipe

250 are filled with water which is contaminated with radionuclides whose source is the contents of the container. The water line of the system exists within the gas source region 255. In some aspects, the water line may be controlled to remain between a high water level 265 and a low water level 270. Shielding exists on top of the gas source region 255 in order to protect workers from the radioactive source within the gas source region and within the vent pipe 250. In some aspects, the portion of the vessel body 205 connected to the vent pipe 250 may have a conical cross section. The conical cross section may have a diameter about the size of that of the vent pipe 250 at its lower extent. The conical cross section may also have a dimeter about the size of that of the vessel body 205 at its upper extent. The atmosphere of the source gas region 215 consists of air plus the source gases hydrogen and oxygen, where the proportions of each gas are controlled by proper design of this invention as described below.

In such example, the contents of the thick-walled vessel 200 in the source gas location 255 may be spent nuclear fuel, damaged spent nuclear fuel, highly damaged fuel debris, special nuclear materials, ion exchange resin loaded with radionuclides, or other radioactive waste. The radioactivity of these contents causes liquid water and hydrocarbon materials also in the container to decompose into hydrogen, oxygen, and possibly other hydrocarbon gases.

In the top lid 210 of the vessel there are a plurality of bore holes 220*a-d*, preferably at least three bore holes (four are shown in the example), which join the source gas region 215 to a second gas region called the filter ullage region 225. The filter ullage region 225 is a very small region located at a higher elevation than the source gas region 215, for reasons discussed further below. Thus, the bore holes 220*a-d* and the filter ullage region 225 are located within the vessel top lid 210. The purpose of the filter ullage region 225 is to receive gases from the source gas region 215, and allow these gases to contact filters 230*a-c* which are positioned in contact with the ambient environment 235. The gases may then diffuse from the filter ullage region 225 through the filters 230*a-c* to the ambient environment 235. Hence, a set of two, three, or more (three are shown in the example) sintered metal filters 230*a-c* are connected to the top of the filter ullage region 225. These filters 230*a-c* may be commercial filters such as commonly fitted to threaded bung holes of thin-wall drums or any other suitable filters. Gases are exchanged between the ambient environment 235 and the filter ullage region 225 through the filters 230*a-c*. The purpose of the filters 230*a-c* is to provide a barrier to prevent contamination release from the container 200. The top lid 210 of the container may have more than one of such vent arrangement provided therein.

When the venting arrangement is properly designed, the gas mixture in the gas source region 215 has a lower density than the gas mixture in the filter ullage region 225. This causes the less dense gas to flow up one or more of the bore holes 220*a-d* from the gas source region 215 to the filter ullage region 225, and it also causes the more dense gas to flow down the remaining bore holes 220*a-d* from the filter ullage region 225 to the gas source region 215. Because the concentrations of hydrogen and oxygen in the filter ullage region 225 are greater than their respective concentrations in the ambient environment 235 outside the filters 230*a-c*, hydrogen and oxygen diffuse through the filters 230*a-c* from the filter ullage region 225 to the ambient environment 235. This is ultimately how the hydrogen and oxygen source gases leave the thick-walled vessel 200.

Proper design of such venting arrangement requires the appropriate selection of: (1) the number of bore holes 220*a-d*, (2) the diameter of the bore holes 220*a-d*, (3) the number of filters 230*a-c*, (4) the number of sets of bore hole/filter ullage/filter groups, and (5) the intrinsic ability of the filters 230*a-c* to pass hydrogen and oxygen.

Example Applications

Example 1—Underwater storage of spent nuclear fuel—this example application involves underwater storage of spent nuclear fuel that has failed, so the failed fuel is sequestered into closed storage containers within the pool. This prevents the release of contamination to the pool at large, and thereby allows normal operations by personnel above the pool.

If the fuel is in a closed container, the gases derived from the radiolysis of water ($H_2$ and $O_2$) will pressurize the container, and therefore the container must be vented. However, the gases to be vented are highly combustible, bounded by the obvious stoichiometric proportion of hydrogen and oxygen. Solutions to the problem involve either a passive trap-style gas release design that can accumulate and vent the stoichiometric mixture while allowing for natural changes in the system volume, or an actively vented design that introduces an inert gas at the proper rate to prevent combustible mixtures. The trap-style design allows for the potential for detonation, while the latter option requires continuous operation and monitoring.

Example 2—Interim shielded storage of damaged fuel and fuel debris—in this example, damaged fuel and fuel debris are placed in a shielded container for interim storage, and for practical reasons it is desirable to tolerate an arbitrary water content in the container, so that stoichiometric gases are generated by radiolysis. The container must therefore be vented.

Clearly in both cases a passive solution that prevents the potential for accumulation of a flammable mixture is a superior solution.

Examples of passive vent designs which may be employed on such examples are illustrated schematically in FIGS. 1 and 2. Essential elements of the design corresponding to example application 1 are as follows:

- The fuel container is located at its normal location in the fuel pool, typically with a submergence depth of about 4 m. It has a vertical vent line attached that allows gases generated within to leave the container. This vent line is filled with water except for the bubbles of radiolysis gases. The vertical vent line is a single pipe between the container and a short distance beneath the pool surface.
- The pipe terminates in a cone whose volume is equal to the contraction volume of the container, and the top level of the cone is the normal pool water line. Due to normal operations, the temperature of the pool at large will vary, and therefore the temperature and volume of the water within the closed container will vary. The volume of the cone is chosen to accommodate the minimum volume of container water (when it is at its lowest temperature). In other words, the water level does not ever go lower than the bottom of the cone (see FIG. 2 reference 270). and resides within the vertical vent pipe.
- The cone mentioned above is joined to a cylindrical section (large diameter pipe) whose volume can accommodate expansion of the closed container water, and yet retain a gas headspace. The conical section plus the aforementioned cylindrical section are the ullage space above the spent fuel stored below. Their size is determined by the application, which dictates the necessary expansion volume, plus contingency. The portion of the conical plus cylindrical volumes occupied by gas will be called the lower gas volume. Sometimes, contaminated water will be below the pool water line, other times, it may be above. The design for the volumes need only include the combination of conical and cylindrical elements in order to maintain an open lower ullage space that is arguably well mixed.

Above the lower gas volume is a radiation shield. This is necessary because the liquid within the lower gas volume is potentially the same as the liquid within the closed fuel container, and therefore shielding is required. (The fuel container is shielded by its submergence, but this small liquid volume is at the water level and therefore close to personnel). For our purposes, the principal radiation source is the 0.662 MeV gamma ray produced by $^{137}$Ba, the daughter of $^{137}$Cs. The half-distance for complete attenuation of this gamma ray is about 1.5 cm in stainless steel. As an example, the dose from the liquid in the lower gas volume will be attenuated by a factor of 1000 by using 15 cm of stainless steel.

Potentially stoichiometric gases will accumulate in the lower gas volume, and they are removed by small bore holes drilled into the radiation shield. Crucially, there are at least two such bore holes, and the number of bore holes is determined by the gas removal needs. Also, the bore holes are drilled at an angle such that the shield is functional and the entrance/exit of the holes prevents direct streaming from the source volume.

Above the radiation shield there is an outlet gas plenum (i.e., filter ullage region). The bore holes from the lower gas volume terminate here. The plenum is small in height and serves only as a mixing zone.

Several filters are attached to the top of the outlet gas plenum. The number of filters is determined by the gas removal rate requirements.

The combination of (a) The number of holes in the shield, (b) The diameter of holes in the shield, (c) The thickness of the shield, (d) the number of filters, and (e) The filter performance specification are crucial to the acceptable performance of the system. In particular, we know that the filter performance is dependent upon its actual application and it is not the same as given by manufacturers' specifications.

Performance Model. The source gas is hydrogen plus oxygen at a worst case rate that is stoichiometric, although the model can vary the proportion. The key to the model is that excess oxygen is represented, so the variable that is tracked is the mole fraction of oxygen in excess of the normal proportion in air. The model considers the densities of the gases flowing both up and down as a combination of excess hydrogen and oxygen. The model is extended to include continuity of both gas species. Filter experiments and manufacturer's specifications provide an important input, the rate at which hydrogen is removed from the filter as a function of the hydrogen mole fraction difference across the filter. Crucially, we do not know the same value for oxygen. In the absence of data we can assume that oxygen removal is proportional to hydrogen removal based upon the ratio of their respective binary diffusion coefficients in air.

Key assumptions of the model are:

Flow in each bore hole is unidirectional, so density-driven counter-current flow in a bore hole is negligible, Single well-mixed values for the hydrogen and excess oxygen concentrations are assumed in the lower gas volume and the outlet gas plenum, Filter performance per gas can be represented by a constant filter coefficient that is independent of the gas concentration differences and the total gas flow rate beneath the filter, and Friction can be sufficiently evaluated using the fully-developed laminar flow friction factor for the entire bore hole length and form losses can be quantified by reference constants. The form loss is assumed to be equally divided between the bore holes for simplicity.

Gas density p is defined by the mole fractions of hydrogen "x" and excess oxygen "y"

$$\rho = \rho_a \frac{\omega}{\omega_a}$$

$$\omega = \omega_a(1 - x - y) + \omega_{H2}x + \omega_{O2}y$$

where ω is molecular weight and the subscript "a" refers to air, and subscripts H2 and O2 refer to hydrogen and oxygen respectively.

The driving pressure for bore hole flow due to buoyancy is $$\Delta P = \rho_a g H[\beta_{H2}(x_1 - x_f) + \beta_{O2}(y_1 - y_f)]$$

$$\beta_{H2} = \frac{\omega_a - \omega_{H2}}{\omega_a};\ \beta_{O2} = \frac{\omega_a - \omega_{O2}}{\omega_a}$$

where H is the shield thickness and the subscript "l" is for the lower gas volume and "f" is for the filter as plenum. The friction and form loss pressure drop is $$\Delta P = \left(\frac{1}{2}\rho_1 u_1^2\right)\left(\frac{K_{TOT}}{2} + \frac{64}{Re(u_1)}\frac{L}{d}\right) + \left(\frac{1}{2}\rho_f u_f^2\right)\left(\frac{K_{TOT}}{2} + \frac{64}{Re(u_f)}\frac{L}{D}\right)$$

where L is the bore hole length and d is the bore hole diameter, and $K_{TOT}$ is the form loss. The first term is for upward flow from the lower gas volume to the filter plenum, and the second term is for downward return flow. The two pressure drops are of course equal, and a non-dimensional version of the equation is $$\beta_{H2}(x_1 - x_f) + \beta_{O2}(y_1 - y_f) = \left(\frac{\rho_1 u_1^2}{2\rho_a g H}\right)\left(\frac{K_{TOT}}{2} + \frac{64}{Re(u_1)}\frac{L}{d}\right) + \left(\frac{\rho_f u_f^2}{2\rho_a g H}\right)\left(\frac{K_{TOT}}{2} + \frac{64}{Re(u_f)}\frac{L}{d}\right)$$

Continuity of total gas flow in equilibrium is $$Q_1 - Q_f = Q_{H2} + Q_{O2}$$

where $Q_1$ is the volume flow rate upward from the lower gas volume. $Q_f$ is the volume rate of return flow, and $Q_{H2}$ and $Q_{O2}$ are the hydrogen and oxygen gas source rates. The velocities used in the pressure drop equation are found from the volume flow terms $$u_1 = \frac{Q_1}{N_1(\pi/4)d^2};\ u_f = \frac{Q_f}{N_f(\pi/4)d^2}$$

where $N_1$ bore holes carry upward flow and $N_f$ bore holes carry downward flow.

Continuity of the hydrogen and excess oxygen is given by $$Q_{H2}=Q_1x_1-Q_fx_f$$

$$Q_{O2}=Q_1y_1-Q_fy_f$$

Lastly, from the definition of the filter performance specification $$Q_{H2}=N_fK_{H2}x_f;\ Q_{O2}=N_fK_{O2}y_f$$

where the number of filters is $N_f$ and the units of the filter performance constant are volumetric flow per mole fraction.

Given the gas source rates $Q_{H2}$ and $Q_{O2}$, the mole fractions $x_f$ and $y_f$ in the filter plenum are immediately defined. The three continuity equations plus the pressure drop equation provide four equations to find the values of the upward and downward volume flow rates $Q_1$ and $Q_f$ and the lower gas volume gas concentrations $x_1$ and $y_1$.

Predictions: Demonstration of a Successful Design. Consider a customer application that requires removal of source gases supplied at a rate up to about 1.0 L/hr of hydrogen and with oxygen in stoichiometric proportion, therefore up to about 0.50 L/hr of oxygen. The goal of the design is to maintain the source gas region hydrogen concentration below about 4%, which is the lower flammability limit (LFL) for hydrogen in air. This is also the LFL for hydrogen in air with excess oxygen.

The model has been applied to yield the following design values that succeed:

Shield thickness 15 cm

Four bore holes of 20 mm diameter

Three filters, Hydrogen coefficient 15.9 L/hr, oxygen coefficient 3.96 L/hr. The hydrogen performance value is based upon filters already tested. The oxygen performance value is conservatively assumed to be about % that of the hydrogen value, corresponding to the ratios of the respective binary diffusion coefficients in air.

Figure 3:
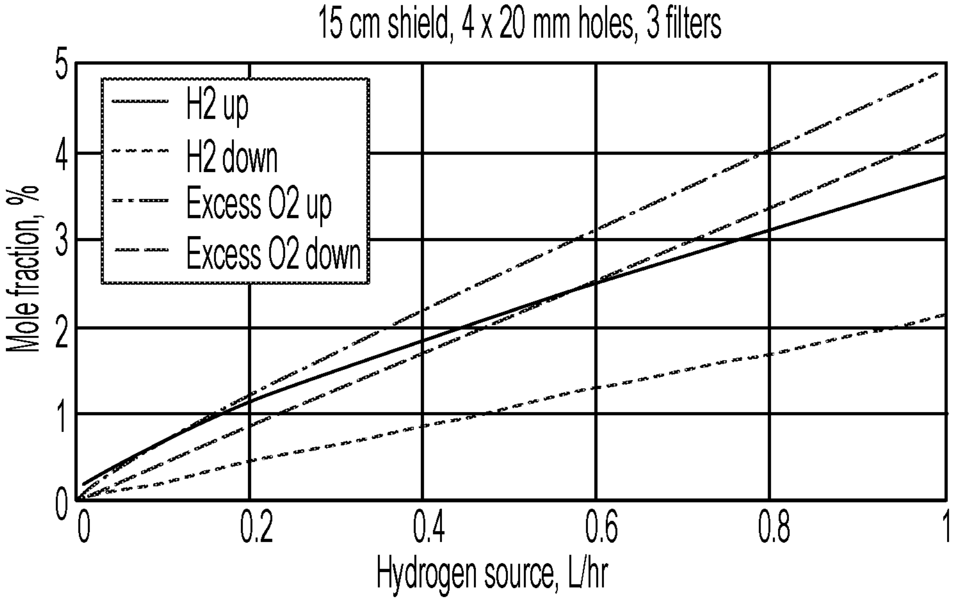
FIG. 3 is a graph showing performance results of a venting arrangement in accordance with one example embodiment of the disclosed concept.

Performance results are shown in FIG. 3. In this figure “up” refers to gases flowing upward in bore holes from the gas source region to the filter ullage region, and “down” refers to the return flow downward.

Under the parameters of the simulation, it appears that this design can handle slightly more than about 1.0 L/hr of hydrogen (with stoichiometric oxygen) and maintain the hydrogen mole fraction in the lower gas volume to less that 4% (the lower flammability limit). This represents the mole fraction of hydrogen capable of diffusing upward through the bore holes. The hydrogen mole fraction in the filter plenum (that is, hydrogen capable of diffusing downwards) is slightly less than half the value in the lower gas volume. Crucially, it should be noted that the source gas mole ratio is about 2:1 hydrogen:oxygen, while the gas source region mole ratio is about 5:4 oxygen:hydrogen. Because of oxygen accumulation in the source region, and oxygen being heavier than air, it is not immediately obvious that the design will work, but the model proves that it will work.

The calculation assumed one bore hole carrying up flow and three carrying down flow, because this yields a slightly higher hydrogen mole fraction compared to results with an equal number of up and down holes. Sensitivity analysis shows that the bore hole diameter should not be reduced below about 15 mm, so the value of 20 mm is a good choice to allow for any possible occlusion. Results are not sensitive to shield thickness.

The value of the filter coefficient for oxygen removal was pessimistically assumed to be about ¼ the value of the hydrogen coefficient because that is the ratio of the binary diffusion coefficients for the two gases in air. However, it is known that mass transfer should dominate the actual gas removal performance, so that the actual rate of removal of excess oxygen should be greater.

Figure 4:
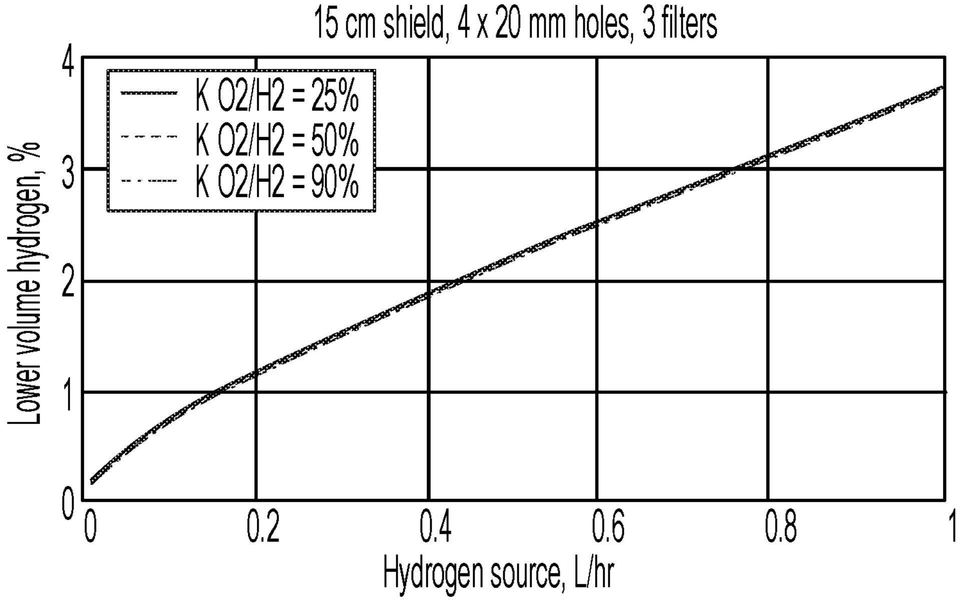
FIG. 4 is a graph showing sensitivity of hydrogen removal example performance to the oxygen removal coefficient for the example of FIG. 3.
Figure 5:
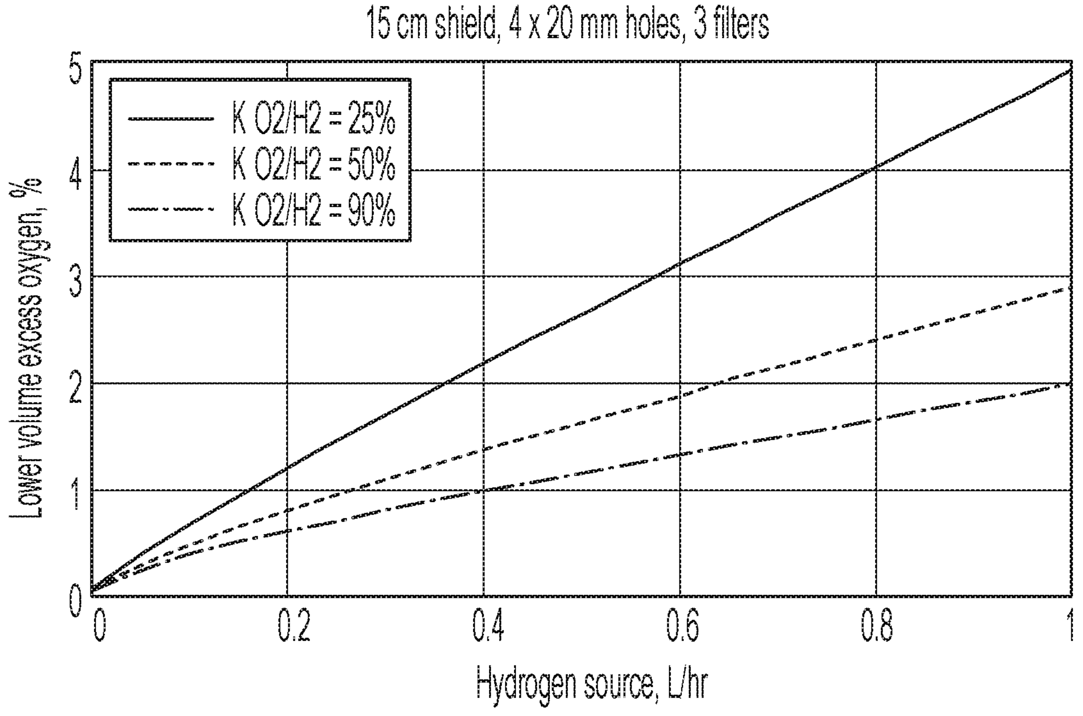
FIG. 5 is a graph showing sensitivity of excess oxygen removal example performance to the oxygen removal coefficient for the example of FIG. 3.

Variation of the oxygen removal coefficient does not noticeably affect hydrogen removal performance as shown in FIG. 4. It may be observed that the relative oxygen removal coefficient versus hydrogen of about 25%, about 50%, and about 90% are all align in FIG. 4 throughout the range of the rate of hydrogen source production. There is of course a variation in the excess oxygen in the lower gas volume as shown in FIG. 5. As depicted in FIG. 5, as the relative oxygen removal coefficient versus hydrogen increases, from about 25% to about 90%, the percent lower volume excess oxygen concentration decreases, again across the entire range of values of the hydrogen source production rate.

While specific embodiments of the invention have been described in detail, it will be appreciated by those skilled in the art that various modifications and alternatives to those details could be developed in light of the overall teachings of the disclosure and that selected elements of one or more of the example embodiments may be combined with one or more elements from other embodiments without varying from the scope of the disclosed concepts. Accordingly, the particular embodiments disclosed are meant to be illustrative only and not limiting as to the scope of the invention which is to be given the full breadth of the appended claims and any and all equivalents thereof.

Various aspects of the subject matter described herein are set out in the following numbered examples:

Example 1. A passive venting arrangement for use in venting of gases produced by radioactive materials, the venting arrangement comprising:

a source gas region structured to receive the gases produced by the radioactive materials:

a filter ullage region disposed above the source gas region and segregated therefrom except for a plurality of bore holes which each extend between, and fluidly couple, the source gas region and the filter ullage region; and a plurality of filters disposed in contact with the filter ullage region, wherein each filter is structured to provide for the exchange of gases from the filter ullage region through the filter to an ambient environment.

Example 2. The passive venting arrangement of Example 1, wherein the plurality of bore holes comprises at least three bore holes.

Example 3. The passive venting arrangement of any one or more of Examples 1 through 2, wherein the source gas region is structured to house the radioactive materials.

Example 4. The passive venting arrangement of any one or more of Examples 1 through 3, wherein the source gas region is structured to receive the gases produced by the radioactive materials which are contained in a source gas location separate from the source gas region.

Example 5. The passive venting arrangement of Example 4, further comprising a vent pipe which is structured to fluidly couple the source gas region and the source gas location.

Example 6. The passive venting arrangement of Example 5, wherein the source gas region is defined in-part by a cone shaped region surrounding an opening of the vent pipe to the source gas region.

Example 7. A containment vessel for use in storing radioactive materials, the containment vessel comprising:

a body defining a source gas region therein which is structured to house the radioactive materials;

a filter ullage region defined in the body above the source gas region and segregated therefrom except for a plurality of bore holes defined in the body which each extend between, and fluidly couple, the source gas region and the filter ullage region; and a plurality of filters disposed in contact with the filter ullage region, wherein each filter is structured to provide for the exchange of gases from the filter ullage region through the filter to an ambient environment.

Example 8. The containment vessel of Example 7, wherein the plurality of bore holes comprises at least three bore holes.

Example 9. The containment vessel of Example 6, wherein the body comprises a removable lid coupled to the body, and wherein the filter ullage region and the plurality of bore holes are defined in the lid.

Example 10. A containment vessel for use in storing radioactive materials, the containment vessel comprising:

a body defining a source gas region therein which is structured to house the radioactive materials;

a first filter ullage region defined in the body above the source gas region and segregated therefrom except for a first plurality of bore holes defined in the body which each extend between, and fluidly couple, the source gas region and the first filter ullage region;

a plurality of first filters disposed in contact with the first filter ullage region, wherein each first filter is structured to provide for the exchange of gases from the first filter ullage region through the first filter to an ambient environment:

a second filter ullage region, independent from the first filter ullage region, defined in the body above the source gas region and segregated therefrom except for a second plurality of bore holes defined in the body which each extend between, and fluidly couple, the source gas region and the second filter ullage region; and a plurality of second filters disposed in contact with the second filter ullage region, wherein each second filter is structured to provide for the exchange of gases from the second filter ullage region through the second filter to an ambient environment.

What is claimed is:

1. A passive venting arrangement for use in venting of gases produced by radioactive materials, the venting arrangement comprising:

a source gas region structured to receive the gases produced by the radioactive materials;

a filter ullage region disposed above the source gas region and segregated therefrom except for a plurality of bore holes which each extend between, and fluidly couple, the source gas region and the filter ullage region; and a plurality of filters disposed in contact with the filter ullage region, wherein each filter is structured to provide for the exchange of gases from the filter ullage region through the filter to an ambient environment, wherein the filter ullage region and the plurality of bore holes are defined in a removable lid.

2. The passive venting arrangement of claim 1, wherein the plurality of bore holes comprises at least three bore holes.

3. The passive venting arrangement of claim 1, wherein the source gas region is structured to house the radioactive materials.

4. The passive venting arrangement of claim 1, wherein the source gas region is structured to receive the gases produced by the radioactive materials which are contained in a source gas location separate from the source gas region.

5. The passive venting arrangement of claim 4, further comprising a vent pipe which is structured to fluidly couple the source gas region and the source gas location.

6. The passive venting arrangement of claim 5, wherein the source gas region is defined in-part by a cone shaped region surrounding an opening of the vent pipe to the source gas region.

7. A containment vessel for use in storing radioactive materials, the containment vessel comprising:

a body defining a source gas region therein which is structured to house the radioactive materials;

a filter ullage region defined in the body above the source gas region and segregated therefrom except for a plurality of bore holes defined in the body which each extend between, and fluidly couple, the source gas region and the filter ullage region; and a plurality of filters disposed in contact with the filter ullage region, wherein each filter is structured to provide for the exchange of gases from the filter ullage region through the filter to an ambient environment, wherein the body comprises a removable lid, and wherein the filter ullage region and the plurality of bore holes are defined in the lid.

8. The containment vessel of claim 7, wherein the plurality of bore holes comprises at least three bore holes.

* * * * *